US012493610B2

(12) United States Patent
Little

(10) Patent No.: US 12,493,610 B2
(45) Date of Patent: Dec. 9, 2025

(54) MINIMIZING TRANSACTION COORDINATOR INTERACTIONS FOR DISTRIBUTED TRANSACTIONS

(71) Applicant: Oracle International Corporation, Redwood Shores, CA (US)

(72) Inventor: Todd J. Little, Lafayette, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/220,692

(22) Filed: Jul. 11, 2023

(65) Prior Publication Data

US 2025/0021544 A1 Jan. 16, 2025

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC .................................................. G06F 16/2379
USPC ....................................................... 707/703
See application file for complete search history.

(56) References Cited

U.S. PATENT DOCUMENTS

2021/0232485 A1* 7/2021 Agarwal ............... G06F 11/364
2023/0412629 A1* 12/2023 Beveridge ........... H04L 63/1433

FOREIGN PATENT DOCUMENTS

CN 111078453 A * 4/2020 .......... G06F 11/0793

* cited by examiner

*Primary Examiner* — Syling Yen
(74) *Attorney, Agent, or Firm* — Hickman Becker Bingham Ledesma LLP

(57) ABSTRACT

Techniques are provided for reducing coordinator roundtrips during a distributed transaction while still ensuring that the transaction coordinator has all the information the coordinator needs to finalize the distributed transaction. The techniques involve inserting "finalization information" from the participants of a transaction in the return messages sent by the participants of the transaction. The finalization information that is included in the return messages sent by each participant is information that enables a coordinator to confirm/cancel or commit/rollback the changes made by the participant, and any participants that are downstream from the participant. When the participants are done, the finalization information obtained from the return messages is provided to the coordinator to allow the coordinator to finalize the distributed transaction.

20 Claims, 3 Drawing Sheets

MINIMIZING TRANSACTION COORDINATOR INTERACTIONS FOR DISTRIBUTED TRANSACTIONS

FIELD OF THE INVENTION

The present invention relates to distributed transactions and, more specifically, to techniques for reducing transaction coordinator interactions for distributed transactions.

BACKGROUND

A transaction is a set of related operations that should either all succeed, or all fail. The Try-Confirm/Cancel protocol is a simple protocol for handling transactions that involve operations performed by microservices. According to the Try-Confirm/Cancel protocol, an "initiator" of the transaction asks other microservices (participants) to reserve resources or place them in escrow. Reserving such resources is analogous to putting items in a shopping cart. Specifically, reserving a resource makes it unavailable for consumption to others, even though the entity making the reservation has not yet committed to its "purchase". Once the initiator and all participants have acquired the required reservations, the initiator then asks a transaction coordinator to confirm all those reservations. Should the initiator decide it does not want or cannot use the reservations made, it asks the transaction coordinator to cancel all the reservations, thereby making the resources available once again for consumption by others.

In order for the Try-Confirm/Cancel protocol to work, the participants in the transaction must be tracked. The transaction coordinator is the entity responsible for tracking the participants in a transaction. For the transaction coordinator to track the participants of a transaction, the initiator and each of the participants "enlists" in the transaction by sending an enlist message to the transaction coordinator. Unfortunately, transmission of such enlist messages can result in a large amount of inter-node traffic, consuming network bandwidth and adding overhead that may reduce the performance of the transactions.

FIG. 1 is a block diagram that illustrates the communication traffic that may be involved in a typical distributed transaction. Referring to FIG. 1, an initiator 100 initiates a transaction. Upon initiating the transaction, the initiator 100 sends a message to coordinator 120 informing coordinator 120 of the transaction. Coordinator 120 responds with an acknowledgement message to indicate that the message from the initiator 100 was received. A message to coordinator 120, along with the corresponding acknowledgement message, is referred to herein as a "coordinator round trip".

Once initiator 100 receives acknowledgement from the coordinator 120, the initiator makes a call 150 to participant 102. To ensure that coordinator 120 knows of participant 102's involvement in the transaction, participant 102 sends an enlist message to coordinator 120, causing another coordinator round trip. In the illustrated example, while performing its part of the transaction, participant 102 issues a call 152 to another participant 104. Participant 104 enlists in the transaction TX1, causing another coordinator round trip.

When participant 104 has finished its portion of the transaction, participant 104 sends a return message to participant 102. Similarly, when participant 102 has finished its portion of the transaction, participant 102 sends a return message 180 to initiator 100.

In the illustrated example, initiator 100 then issues a call to participant 106. Participant 106 enlists in the transaction, causing yet another coordinator round trip. Participant 106 issues a call 156 to participant 108 and a call 158 to participant 110. Participants 108 and 110 enlist in the transaction, causing additional coordinator round trips. Participant 110 issues a call 160 to participant 112, which also enlists, causing a coordinator round trip.

When participant 112 finishes its portion of the transaction, participant 112 sends a return message 190 to participant 110. When participants 109 and 110 finish their respective portions of the transaction, they send return messages 186 and 188, respectively, to participant 106. When participant 106 finishes its portion of the transaction, participant 106 sends return message 184 to initiator 100.

At this point, all of the participants have finished performing their respective work, so initiator 100 sends a confirm message 192 to coordinator 120 to confirm all reservations. Coordinator 120 then calls all entities in the list of participants for the transaction to instruct them to confirm the reservations they made as part of the transaction. When all participants acknowledge that their reservations are confirmed, the transaction is completed.

Having each participant enlist in a transaction (by sending an enlist message to coordinator 120) at the time they become involved in the transaction ensures that the list of participants maintained by coordinator 120 for the transaction is always accurate and complete. This is particularly important if the transaction fails for any reason. Upon detection of the failure, the list maintained by the coordinator may be used to instruct all participants to undo the reservations that they made on behalf of the transaction.

Unfortunately, the robustness that results from having an always-up-to-date list of participants comes at the cost of the messaging overhead produced by so many coordinator round trips. In some situations, the robustness of having an always-up-to-date list of participants is not required. In such situations, it is clearly desirable to reduce the coordinator round-trips, while still ensuring that the coordinator has an accurate list of transaction participants when it comes time to confirm the reservations made during the transaction.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
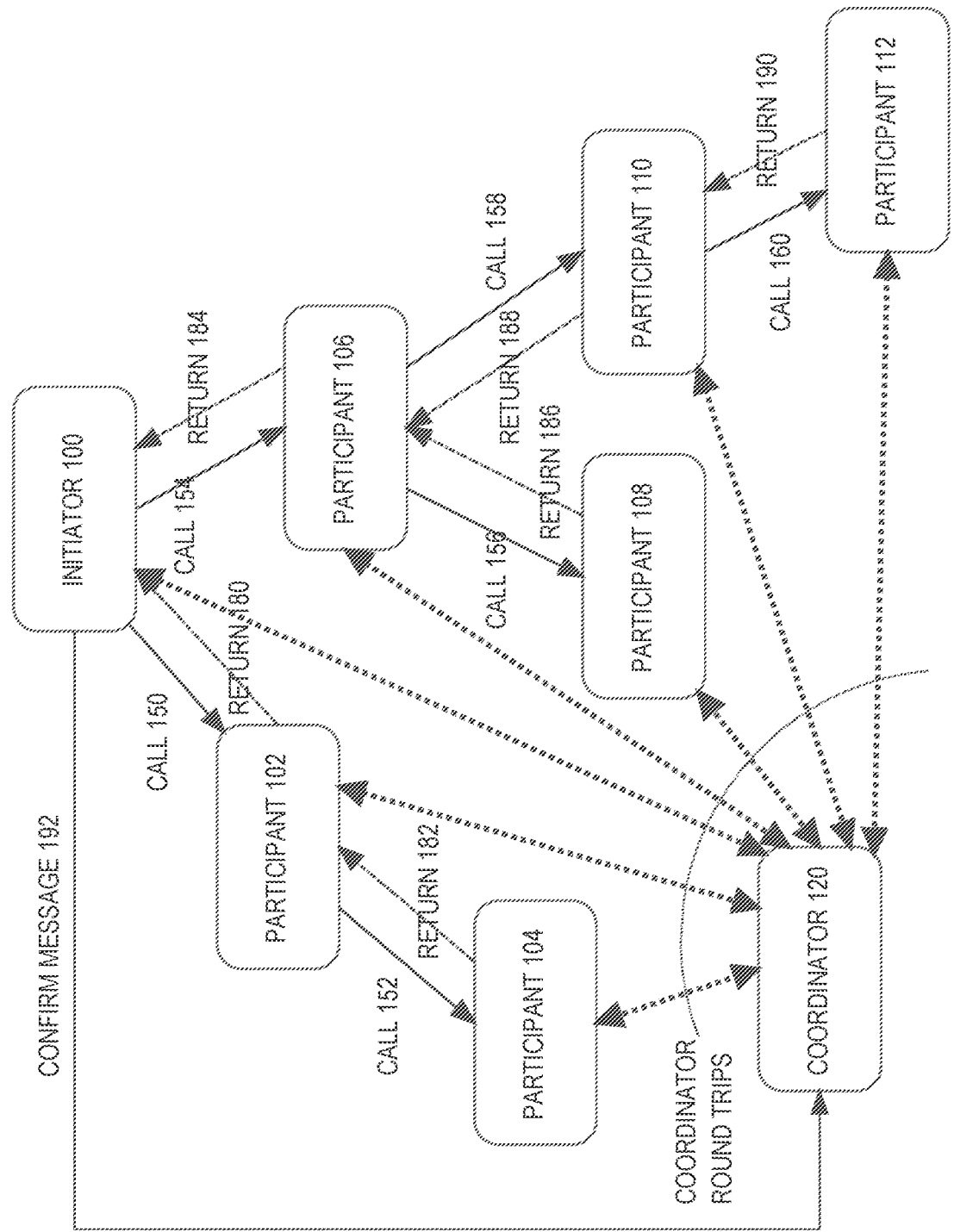
FIG. 1 is a block diagram illustrating a proliferation of coordinator roundtrips during performance of a distributed transaction.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for reducing coordinator roundtrips during a transaction while still ensuring that the transaction coordinator has all the information the coordinator needs to finalize the distributed transaction when it is time to finalize the distributed transaction. The techniques involve inserting "finalization information" from the participants of a transaction in the return messages sent by the participants of the transaction. Specifically, the finalization information that is included in the return messages sent by each participant is information that enables the coordinator to confirm/cancel or commit/rollback the changes made by:

the participant, and any participants that are downstream from the participant

For example, if participant A calls participant B, and participant B calls participant C, then:

the return message from participant C to participant B contains the finalization information for participant C, and the return message from participant B to participant A contains the finalization information for both participant B and participant C Once all of the work for the transaction is complete, the initiator for the distributed transaction will have received the finalization information for all of the participants in the distributed transaction. The initiator may then provide this finalization information to the coordinator in a "finalization message" to enable the coordinator to finalize the transaction.

The techniques are applicable to a wide variety protocols that use an enlistment model for orchestration, including but not limited to Try-Confirm/Cancel protocol, XA, sagas, etc. In some of applicable protocols, the coordinator finalizes the transaction by causing all of the participants to confirm or cancel the reservations. In other applicable protocols, the coordinator finalizes the transaction by causing all of the participants to commit or rollback the changes that the participants made as part of the transaction. The techniques are also applicable in implementations where the same entity serves the role of both initiator and coordinator (e.g. the initiator has an embedded coordinator).

Finalization Information

As explained above, using the techniques described herein, the return messages that are sent between participants in a distributed transaction include "finalization information" that is ultimately used by the transaction coordinator to confirm/commit or cancel/rollback the transaction. The exact information that is included in the finalization information may vary, based on the protocol with which the techniques are used. For example, in some protocols, the finalization information may comprise URIs that correspond to reservations. In other protocols, the finalization information may comprise URLs.

Adding the Finalization Information to the Return Messages

As explained above, rather than engage in a coordinator roundtrip, the participants of a distributed transaction store finalization information in return messages. In one implementation, the participants store the finalization information in a header section of such return messages. For example, in systems that employ REST (REpresentational State Transfer), the finalization information may be inserted into the REST headers of return messages.

Transaction Identification

In some implementations, in addition to including finalization information in the return messages, transaction information is included in the call messages. Specifically, in an embodiment that employs REST, the initiator may generate a globally-unique identifier (GUID) for the transaction, and place the GUID in the REST header of all calls that the initiator makes as part of the distributed transaction. Similarly, the participants read the GUID from the call messages they receive, and include the GUID in the REST header of any calls that they make to downstream participants.

Specifically, when a participant sees a GUID in the REST header of a received call, the participant knows to (a) include the GUID in the header of any calls that it makes as part of the distributed transaction, and (b) include finalization information in any return messages that it sends as part of the distributed transaction. Depending on the protocol and implementation, the GUID may or may not also be included in the return messages that it sends as part of the distributed transaction.

Coordinator Roundtrip Reduction Example

Figure 2:
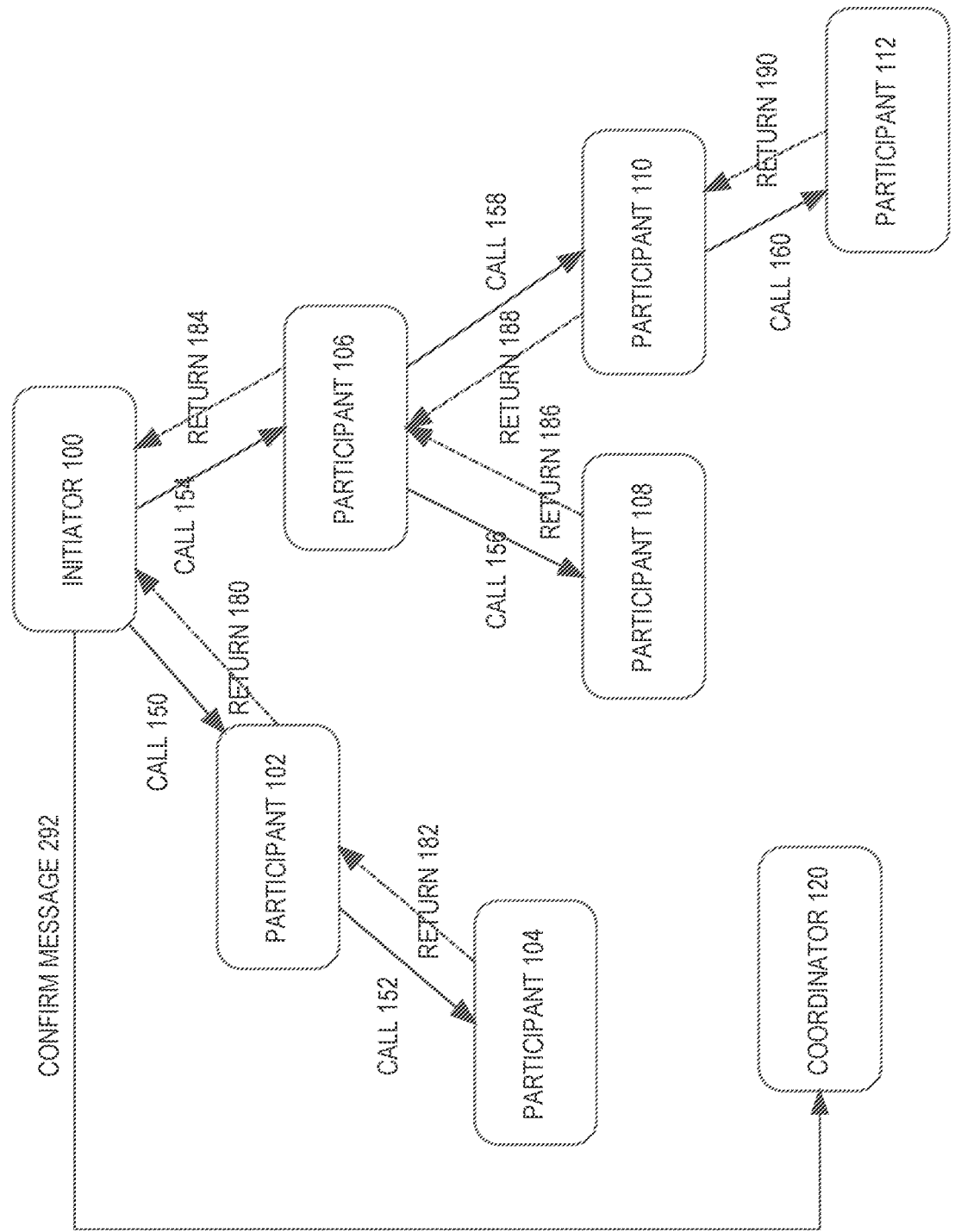
FIG. 2 is a block diagram illustrating the same distributed transaction as shown in FIG. 1 being performed using an implementation of the coordinator roundtrip-reducing techniques described herein.

FIG. 2 is a block diagram illustrating how the same transaction illustrated in FIG. 1 would be carried out using the round-trip reduction techniques described herein. Referring to FIG. 2, initiator 100 initiates the transaction. Upon initiating the transaction, the initiator creates a GUID for the transaction and makes a call 150 to participant 102. This call message, and all call messages sent by downstream participants, include the GUID for the transaction. However, unlike the protocol illustrated in FIG. 1, no participants send enlist messages to coordinator 120.

While performing its part of the transaction, participant 102 issues a call 152 to participant 104. When participant 104 has finished its portion of the transaction, participant 104 sends a return message 182 to participant 102. As explained above, each return message includes finalization information to enable the coordinator to confirm/cancel or commit/rollback the changes made by:

the participant, and any participants that are downstream from the participant

In the present example, there are no participants that are downstream from participant 104, so the return message 182 sent by participant 104 simply includes the finalization information for participant 104. When participant 102 has finished its portion of the transaction, participant 102 sends a return message 180 to initiator 100. Return message identifies:

participant 102, and participant 104, that was downstream from participant 102

Initiator 100 receives return message 180 and, based on the finalization information contained therein, updates the participant list of the transaction to include the finalization information for participant 102 and participant 104.

Initiator 100 then issues a call to participant 106. Participant 106 issues a call 156 to participant 108 and a call 158 to participant 110. Participant 110 issues a call 160 to participant 112. When participant 112 finishes its portion of the transaction, participant 112 sends return message 190 to participant 110. Return message 190 includes the finalization information for participant 112.

When participants 109 and 110 finish their respective portions of the transaction, they send return messages 186 and 188, respectively, to participant 106. Return message 186 includes the finalization information for participant 108. Return message 188 includes the finalization information for both participant 110 and participant 112.

When participant 106 finishes its portion of the transaction, participant 106 sends return message 184 to initiator 100. Return message 184 includes the finalization information for participant 106, participant 108, participant 110, and participant 112. Upon receiving return message 184, initiator updates the participant to list of the transaction to add the finalization information for participants 106, 108, 110 and 112.

At this point, all of the participants have finished performing their respective work, so initiator 100 sends a finalize message 292 to coordinator 120 to finalize the distributed transaction. Finalize message 292 differs from confirm message 192 in that finalize message 292 includes the finalization information for all participants. Upon receiving the finalization information in the finalize message 292, coordinator 120 has all the information it needs to finalize the distributed transaction. Coordinator 120 may then then use the finalization information to instruct all participants to confirm the reservations they made as part of the distributed transaction. When all participants acknowledge that their reservations are confirmed, the transaction is completed.

Handling Failures

Unlike prior techniques that rely on coordinator roundtrips to maintain an always-complete list of the participants in a distributed transaction, a system that employs the techniques described herein may fail at a time where the complete list of participants is not known. Consequently, in some implementations, systems that employ these techniques may rely on timeouts to handle certain failure scenarios.

For example, assume that the initiator calls microservice A to make a reservation. If the initiator fails to receive a response from microservice A, then there would be no way for the initiator or the transaction coordinator to know about whether microservice A made the requested reservation. In such a scenario, failure handling may be triggered by a timeout caused by microservice A failing to send a return message to the initiator after the lapse of a certain amount of time.

When failures occur downstream (e.g. initiator calls A, A calls B, B calls C, then C fails) the initiator and coordinator may not even be aware of the participants, much less whether a reservation was made by the particular participant that failed. Consequently, in some implementations, the timeouts are handled by the participants, as the initiator may not know about the reservation made by a failed participant due to a failure of the participant to send a return message. Similarly, the coordinator cannot manage the timeouts as it also will not know about these sorts of failures.

The duration of the timeouts used in the participants may be determined in a variety of ways. For example, in one implementation, the duration could be a combination of:

Either a configuration item or an API parameter in the initiator that indicates the maximum amount of time allowed for the transaction, before the entire transaction times out. This would typically be conveyed to the participants via headers in a request and that sets the upper limit for a transaction duration the participant should use.

A configuration item in the participant—a participant could indicate via configuration that the service reserveRoom or all services have a maximum timeout value which would be used by the participant if involved in a transaction with a longer timeout.

In one implementation, when a participant discovers or determines that a reservation it is holding for a transaction has timed out, it would in effect cancel the reservation, much as if the coordinator had asked it to cancel the reservation via an HTTP DELETE request. The participant might log this timeout or somehow keep a record of the automatic cancellation, but that is entirely up to the participant.

It should be noted that transaction timeouts should be avoided if possible as they are a common cause of heuristic outcomes. The propagation/dissemination of timeout information may be handled as part of the enlistment in the transaction, so can be carried by headers. It does require code in the participants to honor the timing out of a reservation as under certain failure scenarios, it's possible the caller of the participant doesn't know about the transaction due to some communication failure.

As one practical example, assume that an initiator starts a transaction with a maximum timeout (duration) of 1200 seconds, or 20 minutes. It then calls service reserveRoom, and passes the timeout value. How this is passed is implementation dependent, although a common means would be assuming some level of clock synchronization between the initiator, coordinator, and participants, is passing a deadline, i.e., the transaction must complete by 1:21:05 pm CST, or it will be timed out, i.e., assumed to have failed. The reserveRoom service could be configured with a maximum timeout of 5 minutes. The reserveRoom service would use the lesser value of 5 minutes, and after that time if it hasn't received the confirm request, it will cancel the reservation. So, if the initiator then calls reserveFlight, and the reserveFlight service has a maximum timeout of 10 minutes and then takes 6 minutes to complete, the room reservation would have timed out even though the flight reservation has not yet timed out.

Should the initiator then decide to confirm the transaction as it doesn't know or realize the room reservation has timed out, the transaction coordinator would get back mixed results from the confirm. The hotel participant would report that the reservation timed out or no longer exists. The airline service would successfully confirm the flight, and you'd be left with a heuristic outcome, i.e., one where either the total outcome of the transaction isn't known, or where some participants confirm and some cancel. It's also possible that the coordinator could determine that there is no point in trying to confirm the transaction if it knows the participant timeout values indicate that a participant has already timed out. This would help minimize heuristic outcomes.

Alternative recovery techniques could be used for protocols such as XA. In the XA case, the "system" could be configured to know what resource managers are possibly involved in an operation, and in the case of a failure during the operation, the coordinator could ask the resource managers to recover any in-doubt transactions. The coordinator would then examine its logs and if the transaction had already proceeded to the commit phase, the coordinator would commit the in-doubt transactions. Otherwise, the transaction never got past the prepare phase, so the coordinator would rollback all of the in-doubt transactions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
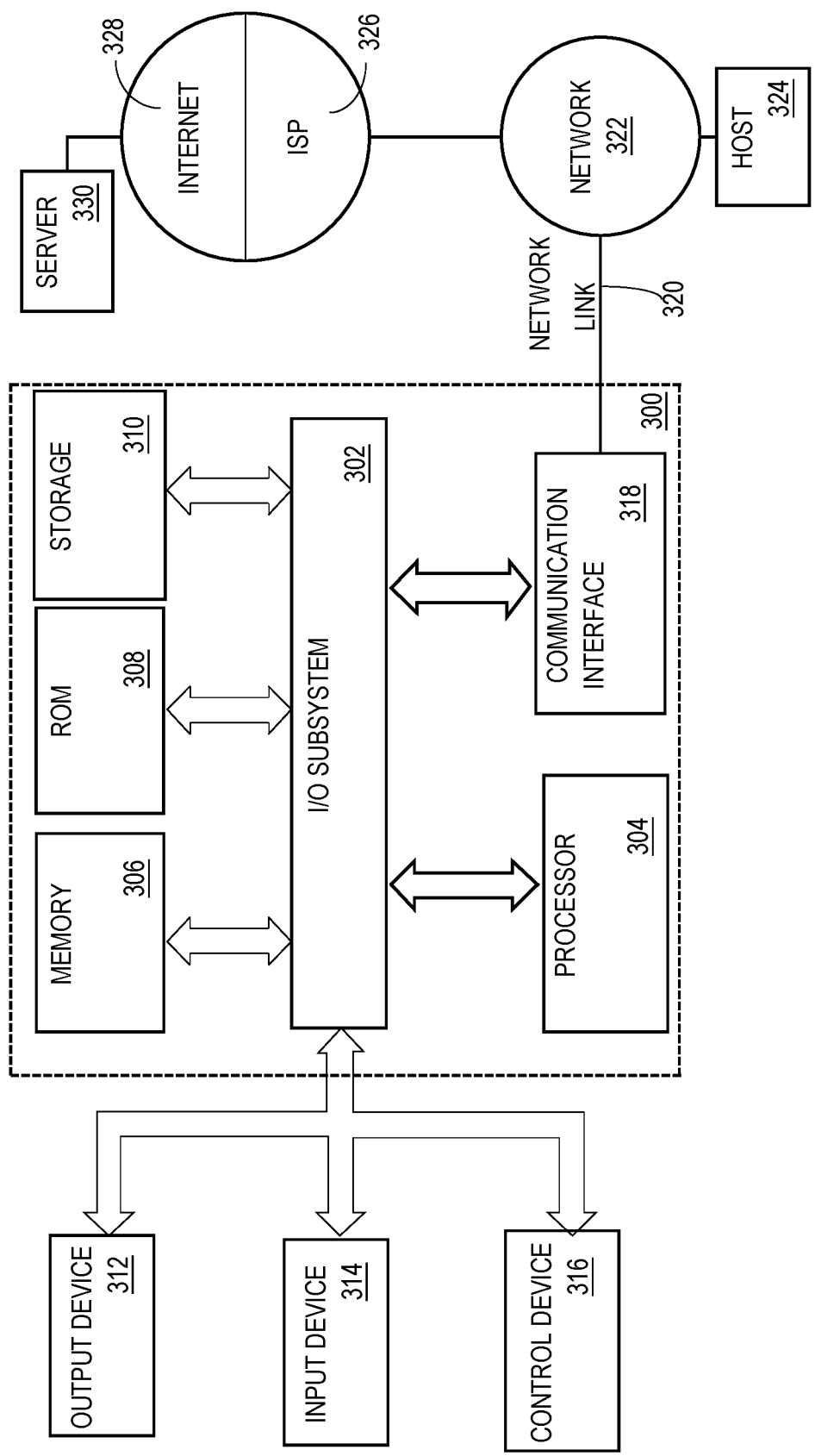
FIG. 3 is a block diagram of a computer system that may be used to implement the coordinator roundtrip-reducing techniques described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method comprising:
   causing an initiator to make one or more calls as part of a distributed transaction;
   wherein a transaction coordinator manages the distributed transaction according to a transaction protocol;
   wherein the one or more calls result in causing each of a plurality of participants to perform a respective portion of the distributed transaction;
   wherein each participant of the plurality of participants performs its respective portion of the distributed transaction in response to a call message received by the participant from either the initiator or another participant of the plurality of participants;
   wherein the plurality of participants includes a first participant and a second participant and wherein the second participant is downstream from the first participant;
   causing each participant of the plurality of participants to respond to the call message it receives by sending a return message that includes finalization information for the participant, wherein the finalization information for the participant includes information that enables the transaction coordinator to finalize changes made by the participant according to the transaction protocol, and wherein the return message for the first participant includes the finalization information for the first participant and the second participant;
   in response to the one or more calls, the initiator receiving one or more return messages;
   from the one or more return messages, the initiator extracting finalization information for each of the plurality of participants; and
   causing the transaction coordinator to finalize the distributed transaction using the finalization information, for each of the plurality of participants, that was extracted by the initiator, from the one or more return messages;
   wherein the method is performed by one or more computing devices.

2. The method of claim 1 wherein:
   the first participant performs its portion of the distributed transaction in response to a first call message from the initiator;
   the second participant performs its portion of the distributed transaction in response to a second call message from the first participant;
   the second participant adds second finalization information to a second return message to the second call message;
   the first participant adds the second finalization information and first finalization information to a first return message to the first call message;
   the first finalization information enables the transaction coordinator to finalize the portion of the distributed transaction performed by the first participant; and the second finalization information enables the transaction coordinator to finalize the portion of the distributed transaction performed by the second participant.

3. The method of claim 1 further comprising:
the initiator generating a transaction identifier for the distributed transaction;
the initiator including the transaction identifier in each of the one or more calls; and
each participant of the plurality of participants including the transaction identifier in any calls made to any downstream participants in the distributed transaction.

4. The method of claim 3 wherein:
including the transaction identifier in each of the one or more calls includes adding the transaction identifier to a header of each of the one or more calls; and
including the transaction identifier in any calls made to any downstream participants includes adding the transaction identifier to a header of any calls made to any downstream participants.

5. The method of claim 1 wherein:
the distributed transaction is performed using a Try-Confirm/Cancel protocol; and
causing the transaction coordinator to finalize the distributed transaction using the finalization information includes either:
based on the finalization information for each of the plurality of participants, the transaction coordinator causing reservations made by all of the participants of the plurality of participants to be confirmed; or
based on the finalization information for each of the plurality of participants, the transaction coordinator causing reservations made by all of the participants of the plurality of participants to be cancelled.

6. The method of claim 5 further comprising:
detecting that a reservation is not confirmed within a timeout period; and
signaling a failure responsive to determining that the reservation is not confirmed within the timeout period.

7. The method of claim 1 wherein the initiator and the transaction coordinator are implemented as a single entity.

8. The method of claim 1 wherein:
the initiator and the transaction coordinator are implemented as different entities; and
causing the transaction coordinator to finalize the distributed transaction using the finalization information for each of the plurality of participants comprises the initiator sending a finalization message to the transaction coordinator, wherein the finalization message contains the finalization information for each of the plurality of participants.

9. The method of claim 1 wherein:
causing the transaction coordinator to finalize the distributed transaction using the finalization information includes either:
based on the finalization information for each of the plurality of participants, the transaction coordinator causing changes made by all of the participants of the plurality of participants to be committed; or
based on the finalization information for each of the plurality of participants, the transaction coordinator causing changes made by all of the participants of the plurality of participants to be rolled back.

10. The method of claim 1 wherein sending a return message that includes finalization information comprises adding the finalization information to a header of the return message.

11. One or more non-transitory computer-readable media storing instructions which, when executed by one or more computing devices, cause:
causing an initiator to make one or more calls as part of a distributed transaction;
wherein a transaction coordinator manages the distributed transaction according to a transaction protocol;
wherein the one or more calls result in causing each of a plurality of participants to perform a respective portion of the distributed transaction;
wherein each participant of the plurality of participants performs its respective portion of the distributed transaction in response to a call message received by the participant from either the initiator or another participant of the plurality of participants;
wherein the plurality of participants includes a first participant and a second participant and wherein the second participant is downstream from the first participant;
causing each participant of the plurality of participants to respond to the call message it receives by sending a return message that includes finalization information for the participant, wherein the finalization information for the participant includes information that enables the transaction coordinator to finalize changes made by the participant according to the transaction protocol, and wherein the return message for the first participant includes the finalization information for the first participant and the second participant;
in response to the one or more calls, the initiator receiving one or more return messages;
from the one or more return messages, the initiator extracting finalization information for each of the plurality of participants; and
causing the transaction coordinator to finalize the distributed transaction using the finalization information, for each of the plurality of participants, that was extracted by the initiator, from the one or more return messages.

12. The one or more non-transitory computer-readable media of claim 11 wherein:
the first participant performs its portion of the distributed transaction in response to a first call message from the initiator;
the second participant performs its portion of the distributed transaction in response to a second call message from the first participant;
the second participant adds second finalization information to a second return message to the second call message;
the first participant adds the second finalization information and first finalization information to a first return message to the first call message;
the first finalization information enables the transaction coordinator to finalize the portion of the distributed transaction performed by the first participant; and
the second finalization information enables the transaction coordinator to finalize the portion of the distributed transaction performed by the second participant.

13. The one or more non-transitory computer-readable media of claim 11 further comprising instructions that cause:
the initiator generating a transaction identifier for the distributed transaction;
the initiator including the transaction identifier in each of the one or more calls; and
each participant of the plurality of participants including the transaction identifier in any calls made to any downstream participants in the distributed transaction.

14. The one or more non-transitory computer-readable media of claim 13 wherein:
including the transaction identifier in each of the one or more calls includes adding the transaction identifier to a header of each of the one or more calls; and
including the transaction identifier in any calls made to any downstream participants includes adding the transaction identifier to a header of any calls made to any downstream participants.

15. The one or more non-transitory computer-readable media of claim 11 wherein:
the distributed transaction is performed using a Try-Confirm/Cancel protocol; and
causing the transaction coordinator to finalize the distributed transaction using the finalization information includes either:
based on the finalization information for each of the plurality of participants, the transaction coordinator causing reservations made by all of the participants of the plurality of participants to be confirmed; or
based on the finalization information for each of the plurality of participants, the transaction coordinator causing reservations made by all of the participants of the plurality of participants to be cancelled.

16. The one or more non-transitory computer-readable media of claim 15 further comprising instructions that cause:
detecting that a reservation is not confirmed within a timeout period; and
signaling a failure responsive to determining that the reservation is not confirmed within the timeout period.

17. The one or more non-transitory computer-readable media of claim 11 wherein the initiator and the transaction coordinator are implemented as a single entity.

18. The one or more non-transitory computer-readable media of claim 11 wherein:
the initiator and the transaction coordinator are implemented as different entities; and
causing the transaction coordinator to finalize the distributed transaction using the finalization information for each of the plurality of participants comprises the initiator sending a finalization message to the transaction coordinator, wherein the finalization message contains the finalization information for each of the plurality of participants.

19. The one or more non-transitory computer-readable media of claim 11 wherein:
causing the transaction coordinator to finalize the distributed transaction using the finalization information includes either:
based on the finalization information for each of the plurality of participants, the transaction coordinator causing changes made by all of the participants of the plurality of participants to be committed; or
based on the finalization information for each of the plurality of participants, the transaction coordinator causing changes made by all of the participants of the plurality of participants to be rolled back.

20. The one or more non-transitory computer-readable media of claim 11 wherein sending a return message that includes finalization information comprises adding the finalization information to a header of the return message.

* * * * *